Oct. 16, 1928.

D. E. HARDING 1,688,308

ELECTRICAL AREA MEASURING DEVICE

Filed March 14, 1927    4 Sheets-Sheet 1

Inventor
Dana E. Harding
by James R. Hodder
Attorney

Oct. 16, 1928.

D. E. HARDING 1,688,308

ELECTRICAL AREA MEASURING DEVICE

Filed March 14, 1927 4 Sheets-Sheet 4

Inventor
Dana E. Harding
by James K. Hoods
Attorney

Patented Oct. 16, 1928.

1,688,308

UNITED STATES PATENT OFFICE.

DANA E. HARDING, OF MELROSE, MASSACHUSETTS, ASSIGNOR TO HARDING ENGINEERING COMPANY, OF EAST BOSTON, MASSACHUSETTS, A CORPORATION OF MASSACHUSETTS.

ELECTRICAL AREA-MEASURING DEVICE.

Application filed March 14, 1927. Serial No. 175,223.

My present invention relates to measuring machines and more particularly to an improved area measuring machine of the electrical type.

An important operation in the manufacture of leather from hides or skins is that of measuring the hide or skin to determine the superficial area thereof, as practically all relatively light leather, such as leather for shoe uppers or the like, is sold in accordance with the superficial area as well as the thickness thereof.

Various means have been devised for rapidly and accurately measuring the superficial area of a hide or skin, none of which are particularly accurate, and are open to rejection as being slow in operation. Practically all of such devices are mechanically operated and depend for the measuring on the action of integrating wheels which rotate by engagement with the hide or skin as the same passes through the machine. Where the devices employed have been electrical, the electrical devices were controlled by the passage of the hide through the machine and in all cases of which I am aware, the hide is a moving element—that is, movable relatively to the measuring devices during the measuring operation. Due to slippage of the hide, inaccuracy of the various elements, and, in general, to the large number of variables present, there is always a doubt as to the superficial area of the hide or skin thus measured.

In my present invention, I have obviated the objections of prior apparatus, as noted above, and have produced an electrical measuring machine in which the hide or skin to be measured remains at rest or quiescent during the measuring operation. By employing a plurality of independent elements, each having its own operative function with regard to the hide or skin, the net results of such operations are collectively gathered together or summed up in the control of an electrical indicating or measuring device. By this means, the number of variables are considerably reduced and, therefore, the chances of error in the final result are sensibly reduced.

In carrying out my invention, I utilize a table or platform of conducting material on which the hide or skin to be measured is placed, and associated with said platform are a plurality of independently movable plungers, each plunger electrically connected to an indicating instrument through a known resistance. The conducting plate or platform is also connected to said indicating instrument and when the plurality of independently movable plungers and the movable plate or platform are brought into association with each other, only those plungers will make contact with the plate as are out of alinement with the hide or skin resting on the plate. Only those plungers, therefore, that engage directly with the plate will close circuits through their respective resistances and to and through the indicating instrument. The instrument is calibrated for direct reading preferably, although may be calibrated in any manner desired, and the superficial area in any unit desired may be read directly from the electrical indicating instrument.

The principal object of my invention, therefore, is an improved area measuring machine.

Another object of my invention is an improved electrically operated area measuring machine.

A further object of my invention is an improved electrically operated area measuring machine in which the hide or skin to be measured is at rest.

Other objects and novel features of the construction and arrangement of parts comprising the device will appear as the description of the invention progresses.

In the accompanying drawings illustrating a preferred embodiment of my invention, Fig. 1 is a front elevation;

Figure 1:
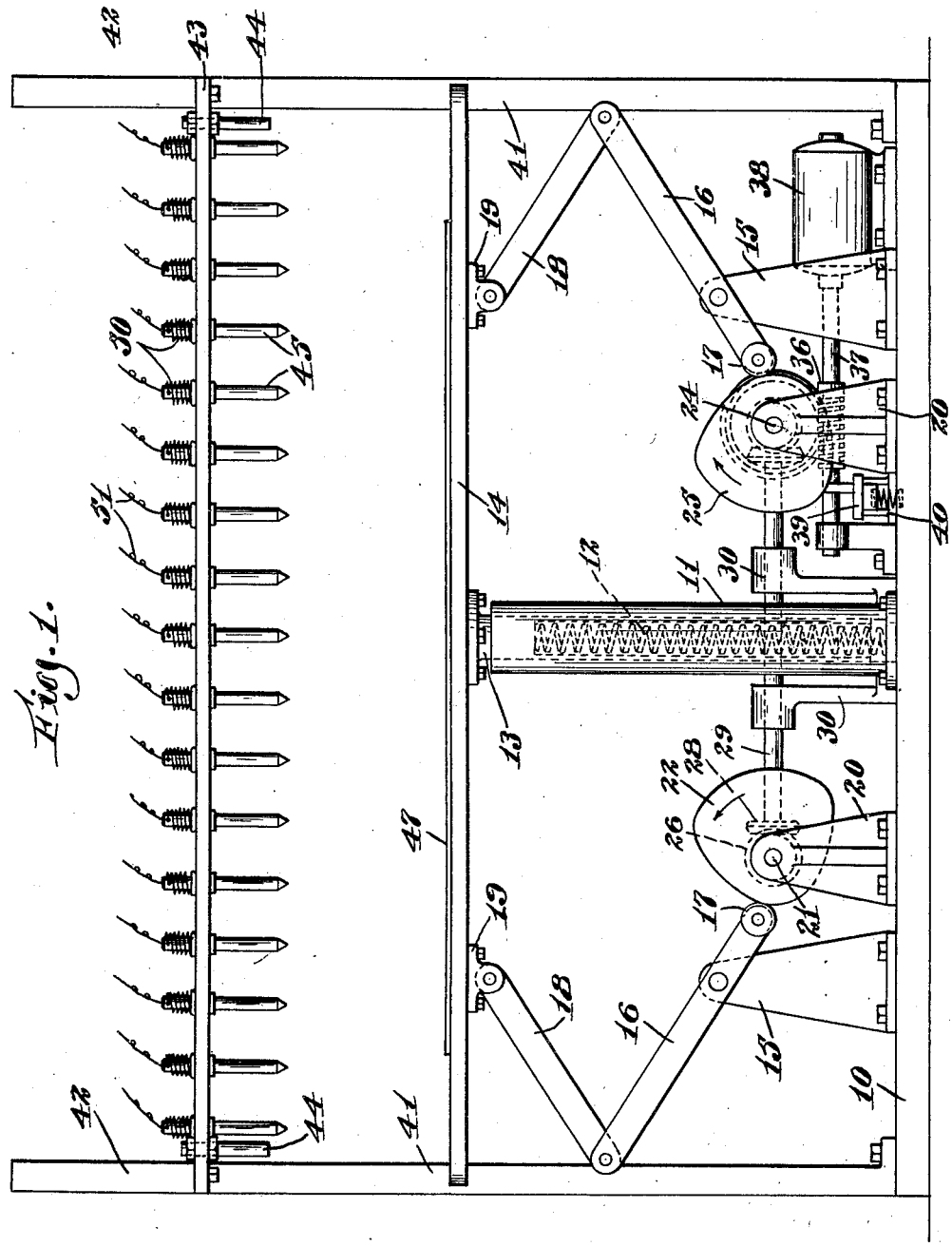
Figure 2:
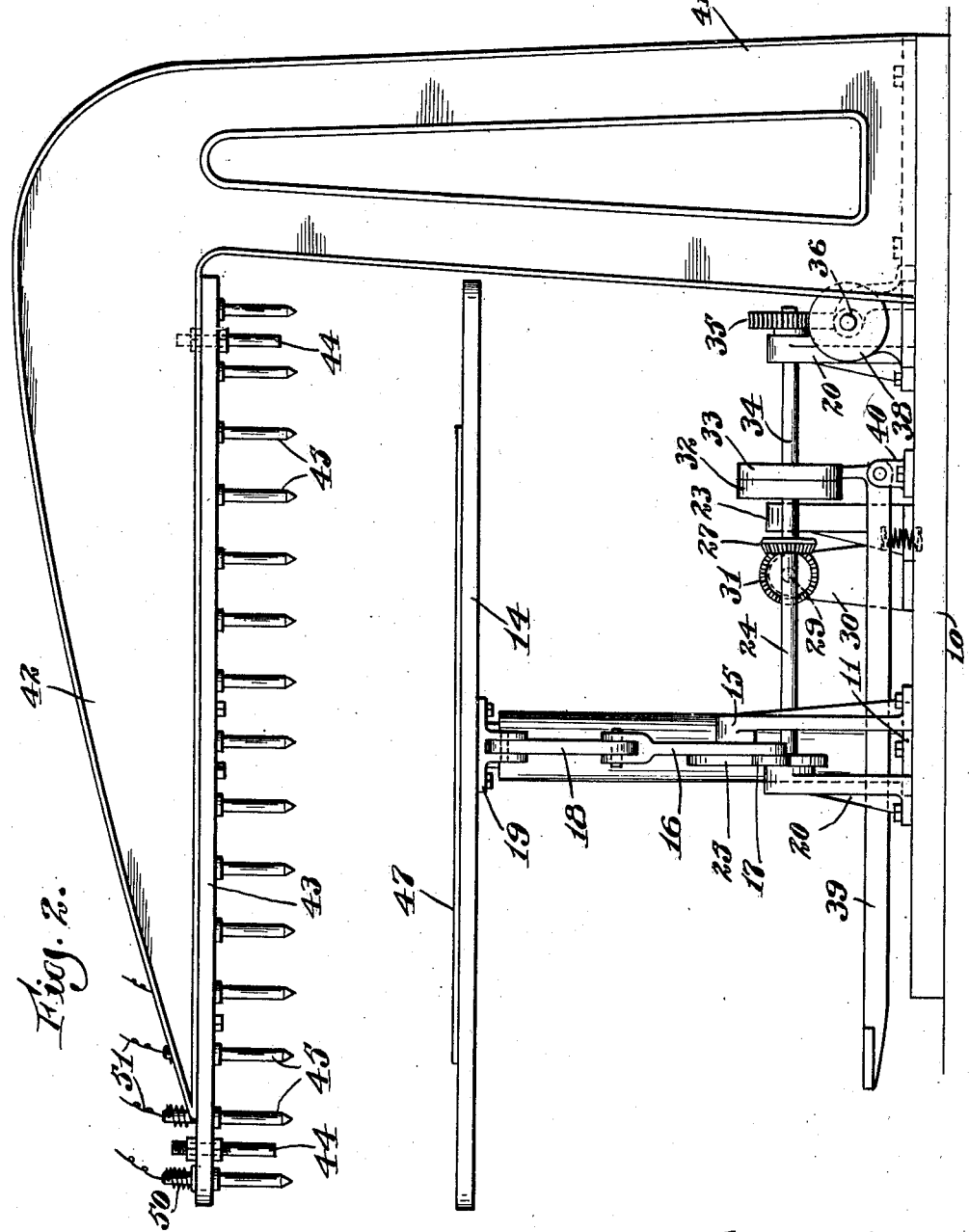
Fig. 2 is a side elevation.

Referring to the drawings, 10 designates a base on which is mounted a hollow pedestal 11, and in which pedestal is yieldingly mounted for vertical movement therein by spring 12 a plunger 13. Secured to, but insulated from, the top of the plunger 13 is a plate or platform 14 of conducting material. The weight of the plate 14 of conducting material is ordinarily sufficient to compress the spring 12 and the normal or inoperative position of the plate or platform 14 is as indicated in Figs. 1 and 2.

Mounted on the base 10 and on each side of the hollow pedestal 11 are bearing standards 15 and in each of the bearing standards 15 is pivotally mounted a lever 16. Rotatably mounted on one end of each of the levers 16 is a cam roll 17 for a purpose to be hereinafter described. Pivotally attached to the other end of each of the levers 16 is a connecting rod 18, each of said connecting rods being pivotally attached to a bearing lug 19, such bearing lugs being secured to, but insulated from, the under surface of the plate or platform 14. Also secured to the base 10 on each side of the hollow pedestal 11 are pairs of bearing members 20. In one pair of the bearing members 20, for example on the left side of the machine as viewed in Fig. 1, is rotatably mounted a shaft 21 and secured in such shaft 21 is a cam 22, which engages with each cam roller 17 on the adjacent lever 16, such shaft 21 rotating in the direction of the arrow shown in Fig. 1. Between the other pair of bearing members 20 but in alinement therewith, is a bearing member 23 and in the bearing member 23 and the forward one of this pair of bearings 20 is rotatably mounted a shaft 24, this shaft, therefore, being parallel to the shaft 21. Secured to the shaft 24 is a cam 25 which engages with the cam roll 17 on the adjacent lever 16, such shaft 24 rotating in the direction of the arrow shown in Fig. 1. Secured to the shaft 21 is a bevel gear 26 and secured to the shaft 24 is a bevel gear 27, similar in pitch and diameter to the gear 26. Meshing with the gear 26 is a bevel gear 28 secured to one end of a shaft 29 that is rotatably mounted in bearing members 30 secured to the base 10 in the rear of the hollow pedestal 11. Secured to the end of the shaft 29 remote from the gear 28 is a bevel gear 31 which meshes with the bevel gear 27. The bevel gears 26, 27, 28 and 31 are assumed to be of the same pitch and diameter so that the shafts 24 and 21 will be rotated at the same speed but in opposite directions on rotation of the shaft 29. Adjacent to the bearing member 23 is one member 32 of a one-revolution clutch, the other member 33 of which clutch is secured to one end of a shaft 34 that is rotatably mounted in the second bearing of the pair of bearings 20 above referred to. Secured to the shaft 34, adjacent to the second bearing of the pair of bearings 20, is a worm wheel 35, which meshes with and is driven by a worm 36 secured to or formed integral with the drive shaft 37 of an electric motor 38 that is secured to the platform 10. From the above, it will be obvious that if the motor 38 is placed in action, and the main shaft 37 thereof rotates in the proper direction, the shaft 24 will be rotated in the direction of the arrow shown in Fig. 1, and, through the train of gears 27, 31, 28, 26, will cause a rotation of the shaft 21 in the opposite direction to that of the shaft 24 and at equal speed thereto, and the rolls 17 on the lever 16 engaging with the cams 22 and 25 respectively will cause an oscillating movement of the levers 16 to take place and will thus impart a vertical up-and-down movement to the plate or platform 14. The above operation is assumed to take place because of the connection of the shafts 34 and 24 by the one revolution clutch 32—33 and the means for operating such clutch is a treadle lever 39 pivotally attached to the bearing member 40 secured to the base 10. The motor 38 will be assumed to be in action constantly while the machine is being operated and, therefore, the shaft 34 is always in rotation. By operating the treadle lever 39, the clutch members 32, 33 will cause a single revolution of the shafts 24 and 21 and the parts of the device will be assumed to be in normal position in Fig. 1 and, therefore, the parts will always stop in the position shown in Fig. 1 when the clutch elements 32, 33 are disengaged from each other.

Secured to the base 10 at one end thereof and in opposite sides of said base are frame members 41 which are spaced apart from each other and extend upwardly, such members having formed integral therewith, forwardly extending portions 42, the under surfaces of which are spaced apart from and lie parallel to the platform 14. Secured to the under surfaces of the forwardly extending portions 42 is a plate 43 of any suitable material. At various intervals adjacent the periphery of such plate 43 are spaced members 44, which, as the plate 14 is moved upwardly, will engage with such plate and prevent approach of the plates 14 and 43 beyond a predetermined point. This, in a sense, constitutes a safety device as the length of the members 44 is such as to insure a space between the plates 14 and 43 wide enough to accommodate the hand of a workman and prevent serious injury should he neglect to remove his hand in time.

Figure 3:
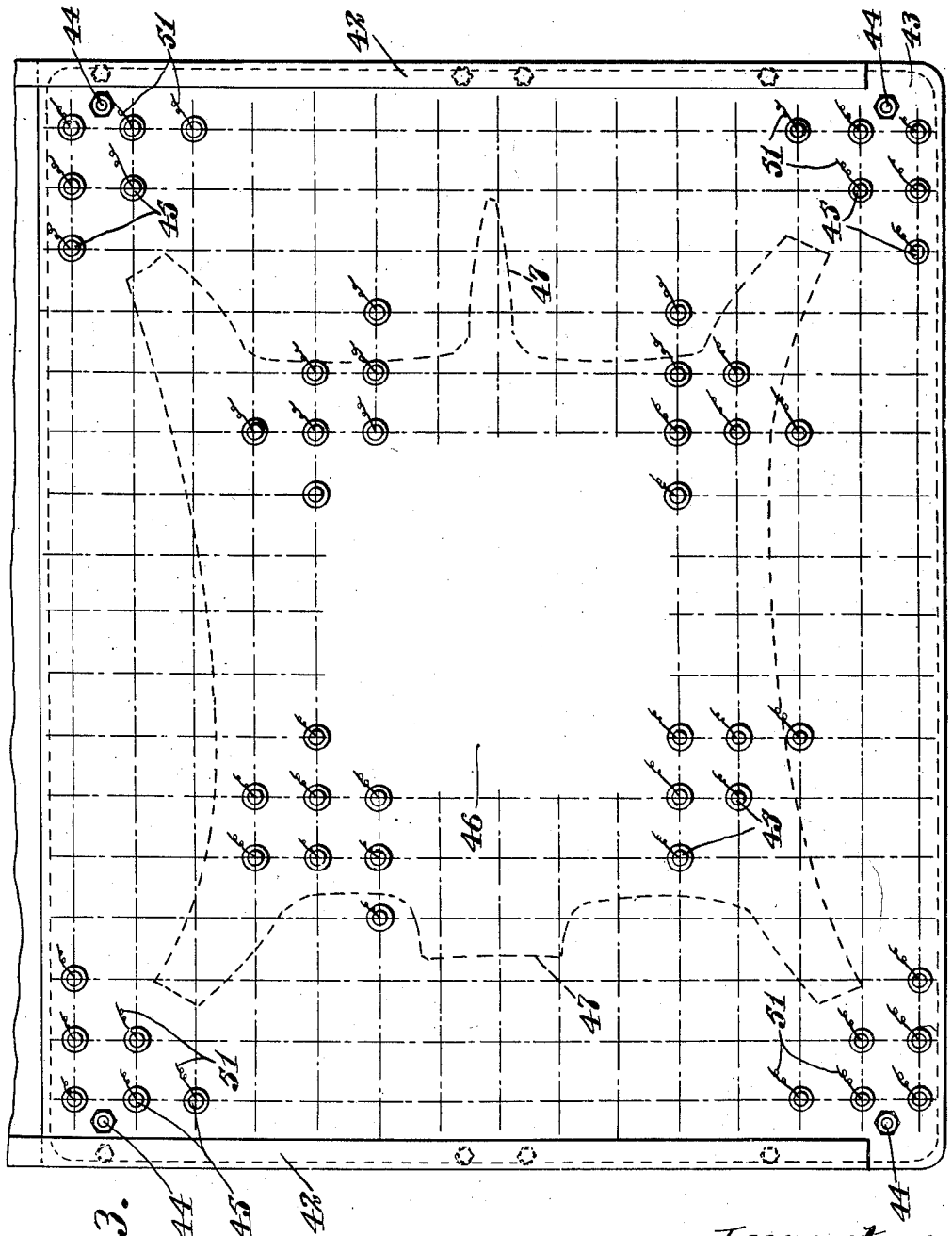
Fig. 3 is a plan view with certain portions of the frame of the machine removed.

Referring to Fig. 3, there is shown an upper view of the plate 43 and it will be noted that such plate is divided into a plurality of squares at the corners of which are located pins 45 except at the central portion, such central portion being designated by the numeral 46 and it will be noted that such central portion is blank. The ordinary hide or skin, designated 47, is bound to have a certain minimum area, the minimum area depending of course on the class of hides to be measured and for ordinary work, it is safe to assume that each hide will have a minimum of two square feet. Therefore, no good purpose would be served by providing movable pins 45 in a place that is bound to be occupied by a hide or skin, and, in fact, would merely tend to complicate the electrical portions of the apparatus. The layout in Fig. 3 is schematic only and, of course, a small number of the vertical movable pins 45 are all that can be shown, it being understood that the number may be any desired, depending on the degree of accuracy it is desired to attain.

Figure 4:
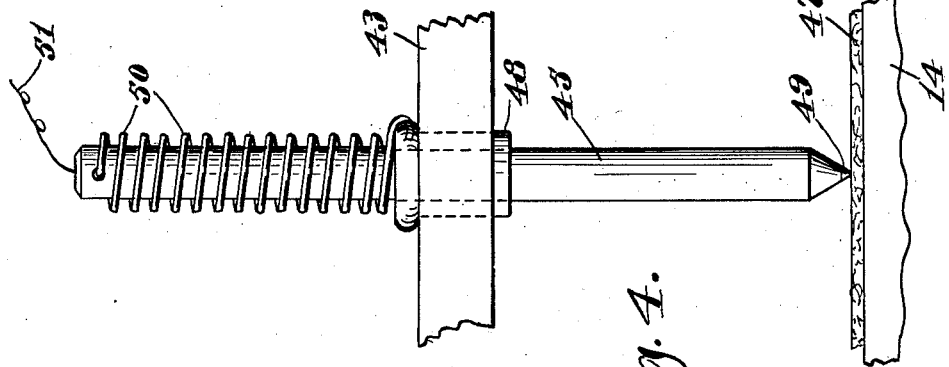
Fig. 4 is an enlarged side elevation of one of the vertically movable contacting devices.
Figure 5:
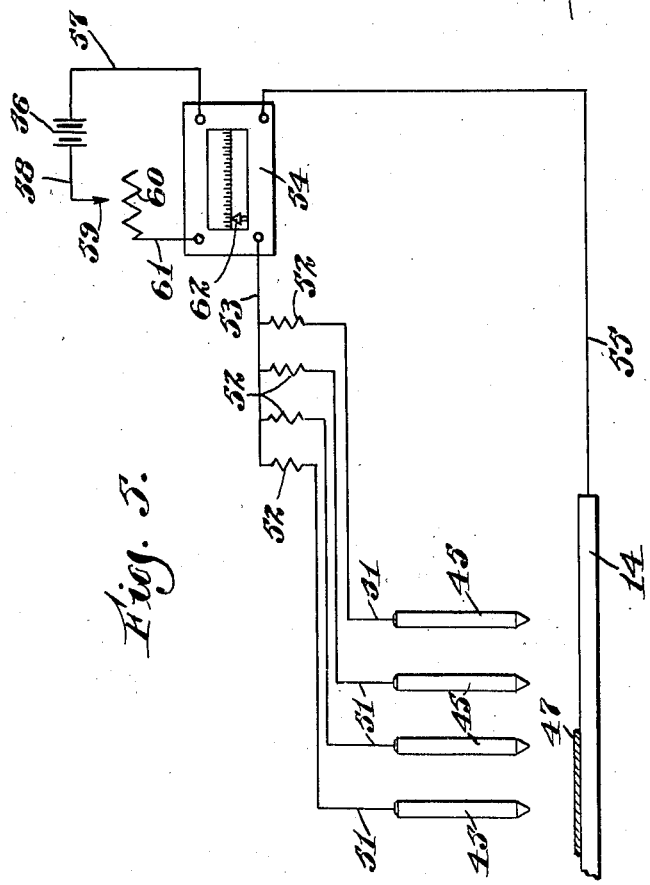
Fig. 5 is a schematic circuit layout showing the method of operation.

Referring to Fig. 4, which shows a portion of the plate 43, it will be noted that such plate is perforated to allow insertion of a bushing 48 of insulated material, in which bushing the pin 45 is slidably mounted. The points 49 of the pins 45 are preferably tipped with a good conducting material, as, for example, silver. The upper end of the pin 45 is drilled to receive one end of a coil spring 50, the other end of this spring being secured to the bushing 48. It is obvious, therefore, that as the pin 45 is moved upwardly, the spring 50 will be extended and on the removal of the extending force, will tend to contract and will bring the pin 45 back into its normal position, as shown, for example, in Figs. 1 and 4. Each of the pins 45 is connected by conductor 51 through a resistance 52 to a conductor 53, that is connected to one terminal of the indicating electrical instrument, as an indicating galvanometer 54. The plate or platform 14 of conducting material is connected by conductor 55 to another terminal of the indicating instrument 54. 56 designates a source of power, one pole of which is connected by conductor 57 to the instrument 54 and the other pole is connected by conductor 58 to a contact 59 associated with a rheostat 60, that, in turn, is connected by conductors 61 to the instrument 54. The use of the rheostat 59, 60 is to regulate the indicator pointer 62 of the instrument 54 and bring the same back to zero.

The operation of my improved device is as follows, it being assumed that the parts are in the position shown in the drawings, and that a hide or skin 47 has been placed on the platform 14 and under the plurality of yieldingly mounted pins 45. The motor 38 is supposed to be in action and when all is ready, the operator, by pressing on the treadle lever 39, operates the one-revolution clutch elements 32, 33, whereupon the shafts 24 and 21 will be rotated at the same speed but in opposite directions, as indicated by the arrows in Fig. 1, and the platform 14 will be moved upward under the influence of pressure exerted on the levers 16 by the cams 22 and 25. The platform 14, moving upwardly, the yieldingly mounted pins 45 will be brought into engagement either with the hide or skin 47 or with the surface of the platform 14, and those pins which come into engagement with the platform 14, will complete a circuit through the conductors 51, 53 and 55, through their respective resistances 52 and will cause a movement of the indicating hand 62 of the instrument 54 in proportion to the number of pins 45 that have thus completed circuit. The instrument 54 is preferably calibrated so as to be a direct reading instrument and the operator, therefore, will be able to read from the instrument 54 the superficial area of the hide or skin 47 and the degree of accuracy of the reading will depend on the number of yieldingly mounted pins in a given area of the member 43. Obviously, as illustrated, the indication on the instrument 54 will be maintained only as long as the pins 45 and platform 14 are in engagement with each other.

Having thus described my invention, what I claim as new is:

1. An improved electrical area measuring instrument comprising a plurality of parallelly arranged yieldingly mounted conducting pins, an electrical indicating instrument, electrical connections extending from each of said pins to said instrument, a vertically movable platform electrically connected with said instrument, said vertically movable pins operating individually to influence the indicating instrument only when in engagement with the vertically movable platform.

2. An electrically operated area measuring machine having a plurality of parallelly arranged contact pins, an electrical indicating instrument, connecting means extending between said contact pins and said indicating instrument, and a conducting plate electrically connected to said indicating instrument and movable toward and from said contact pins, the number of contact pins engaging with the contact plate to influence the indicating instrument depending directly on the superficial area of the material to be measured.

In testimony whereof, I have signed my name to this specification.

DANA E. HARDING.